G. KEITH.
TIRE PUMP.
APPLICATION FILED OCT. 8, 1917.
1,265,211.
Patented May 7, 1918.
2 SHEETS—SHEET 1.
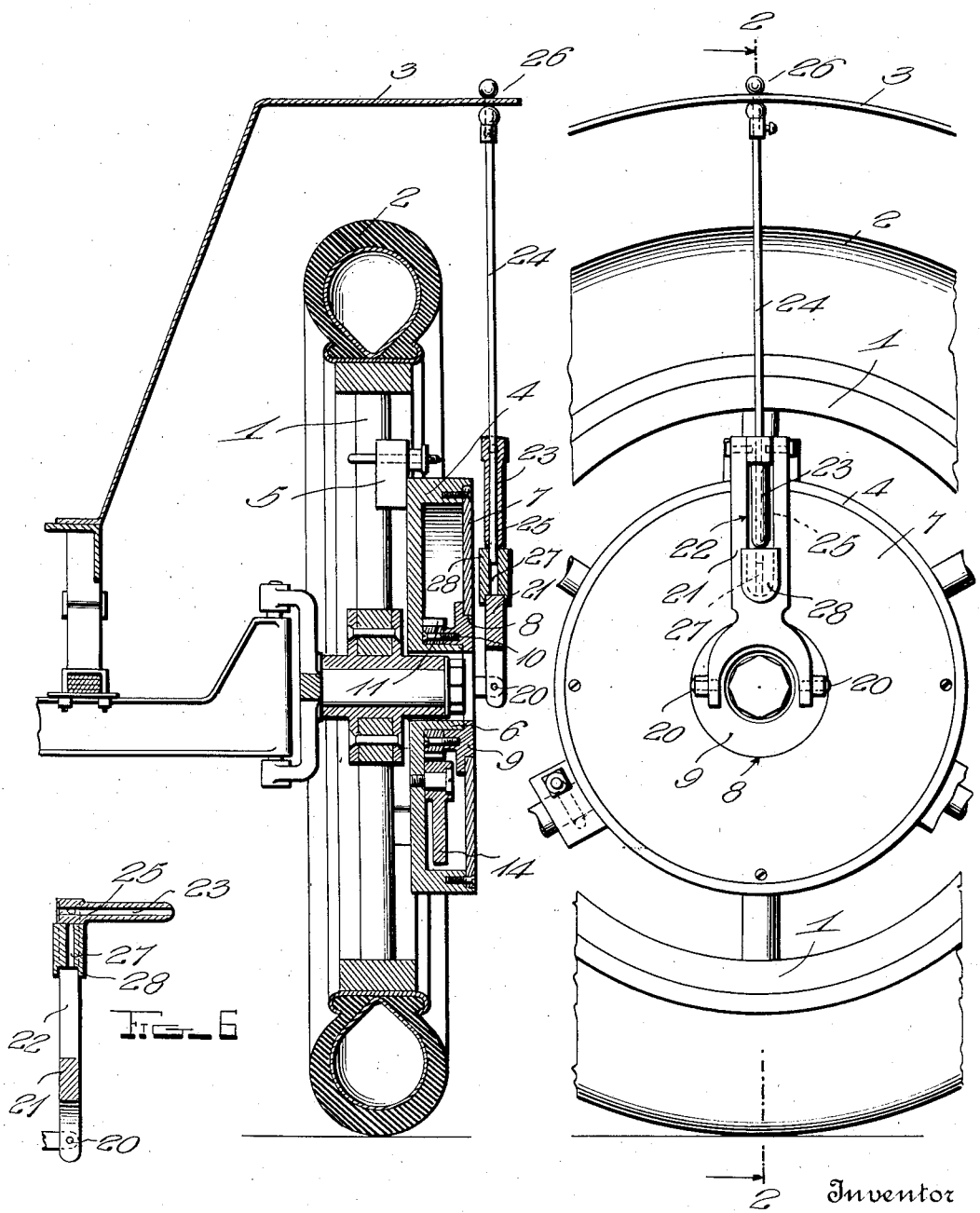
Witness
Inventor
George Keith
By H. B. Willson & Co
Attorneys

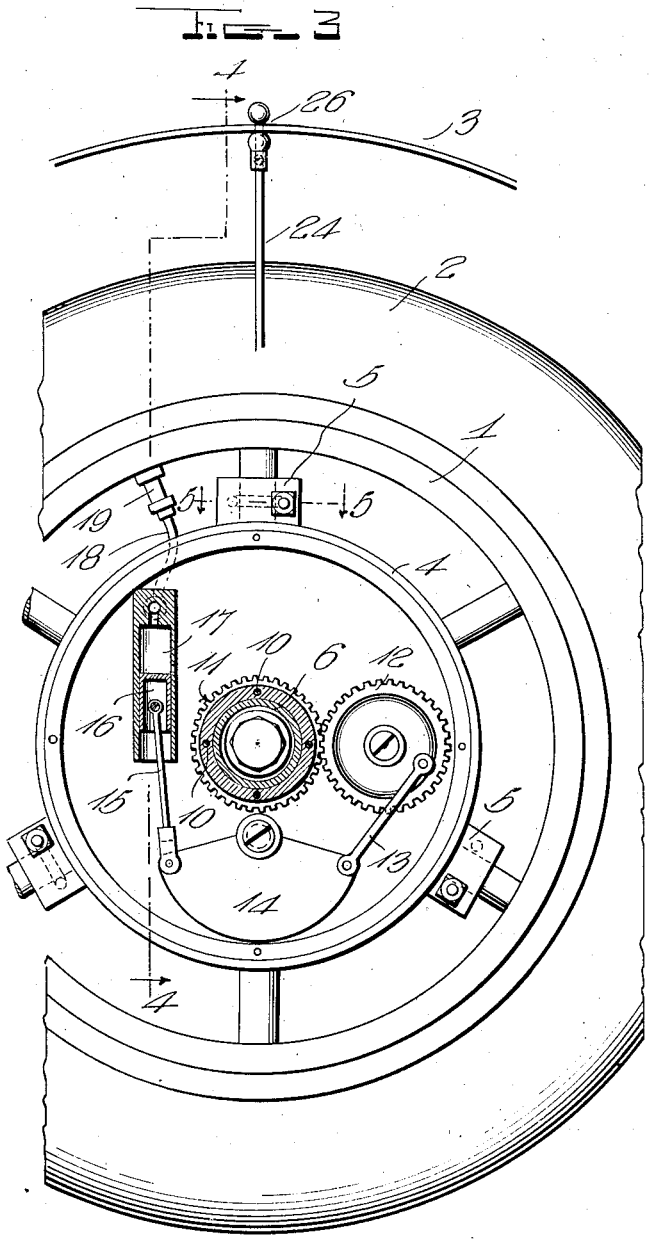
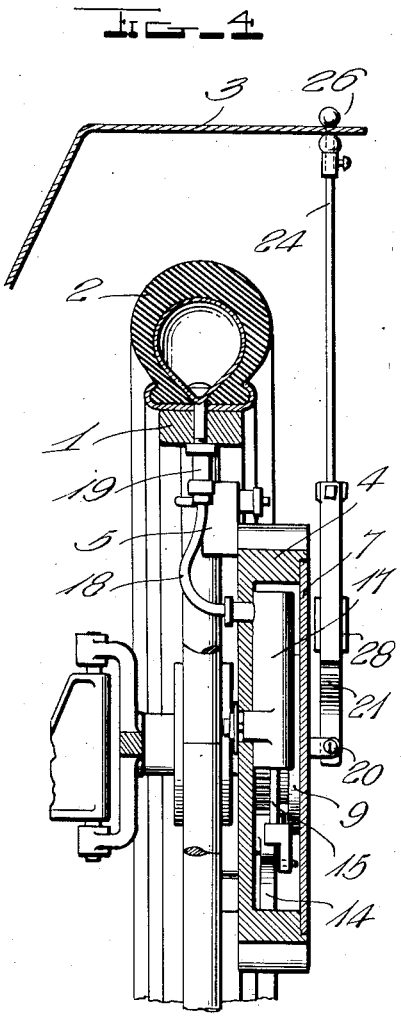
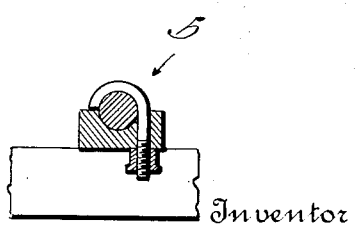

UNITED STATES PATENT OFFICE.

GEORGE KEITH, OF SHERIDAN, ILLINOIS.

TIRE-PUMP.

1,265,211.     Specification of Letters Patent.     Patented May 7, 1918.

Application filed October 8, 1917. Serial No. 195,358.

*To all whom it may concern:*

Be it known that I, GEORGE KEITH, a citizen of the United States, residing at Sheridan, in the county of La Salle and State of Illinois, have invented certain new and useful Improvements in Tire-Pumps; and I do declare the following to be a full, clear, and exact description of the invention, such as will enable others skilled in the art to which it appertains to make and use the same.

My invention relates to improvements in tire pumps and more particularly to those which are carried by and operated from the rotation of the wheel, it being my intention to provide a simply constructed and inexpensive device which may be easily applied to practically any automobile wheel in little time.

With the foregoing general object in view, the invention resides in the novel features of construction and unique combinations of parts to be hereinafter fully described and claimed, the descriptive matter being supplemented by the accompanying drawings which form a part of this specification and in which:—

Figure 1 is a side elevation of a portion of an automobile wheel and its fender, showing the application of the invention;

Fig. 2 is a vertical transverse section of Fig. 1 on the plane of the line 2—2 thereof;

Fig. 3 is a view similar to Fig. 1 with parts removed and in vertical section;

Fig. 4 is a vertical transverse section of Fig. 3 on the plane of the line 4—4 thereof;

Fig. 5 is a detail horizontal section on the plane indicated by the line 5—5 of Fig. 3; and Fig. 6 is a detail vertical section showing the hand operating means for the pump extended for use.

In the drawings above briefly described, the numeral 1 designates an automobile wheel, 2 the pneumatic tire of said wheel, and 3 the wheel fender, these parts being shown only for the purpose of illustrating the application of the invention.

A flat preferably circular casing 4 is positioned at the outer side of the wheel 1 and is secured thereto by any suitable type of clamp 5, the center of the casing having a tubular hub 6 which receives the hub of the wheel 1 as shown clearly in Fig. 1. All working parts of the device are located in the casing 4 for sake of protection and lubrication, and in order that these parts may be accessible when necessary, the casing is provided with a removable front plate 7 having a central opening 8 of greater diameter than the hub 6.

A ring 9 partially plugs the opening 8 and is secured by screws or the like 10 to the driving gear wheel 11 which surrounds the hub 6 and is positioned in the casing 4. The gear 11 meshes with a second gear 12 in the casing 4, said last named gear being connected by a pitman 13 to one end of a walking beam 14 also mounted in the casing, the other end of said walking beam being connected by a rod 15 with a piston 16 in a pump cylinder 17 fixedly mounted in the casing. An outlet tube 18 leads from the cylinder 17 and is connected in any preferred manner with the usual valve 19 of the tire, so that as the pump is operated, either by rotation of the wheel, or by hand, as occasion may demand, the tire will be inflated to the required pressure. When this pressure has been attained, the air compressed by the pump, may be permitted to escape through a safety valve (not shown).

Pivoted at 20 to the ring 9, is the forked lower end of a crank arm 21, said arm having a longitudinal slot 22 in whose outer end a hand hold 23 is pivoted either for swinging into said slot as shown in Figs. 1 and 2, or for positioning at right angles to the crank arm as depicted in Fig. 6. When the hand hold 23 is positioned within the slot 22, a rod 24 is passed through the central bore 25 of said hand hold as shown in Fig. 2, the upper end of said rod being detachably connected in any preferred manner with the fender 3, as indicated at 26. The rod 24 also extends into a bore 27 of a slide 28 in the slot 22. With the parts positioned in this manner, rotation of the wheel will cause the gear 12 to travel around the driving gear 11, so that said first named gear will be rotated to operate the walking beam 14, which in turn reciprocates the piston 16 of the pump cylinder 17, thus supplying the tire with air. During this operation, the central driving gear 11 is held against rotation by the crank arm 21 and associated parts as will be clear from the drawings. Whenever it is necessary to inflate the tire by hand, the rod 24 is removed and the hand hold 23 is swung outwardly to the position of Fig. 6, the slide 28 being now moved outwardly into contact with said hand hold to hold the same at right angles to the crank arm 21. Friction will in most cases be utilized for holding the slide in operative position, but it will be obvious that it could well be provided with a locking means if occasion should so demand.

From the foregoing, taken in connection with the accompanying drawings, it will be obvious that although my invention is of comparatively simple and inexpensive nature, it will be highly efficient and durable, and will be adaptable to numerous types of automobile wheels without in any manner varying the construction of the latter. Since probably the best results are obtained from the several specific details shown and described, these details are preferably employed, but I wish it understood that within the scope of the invention as claimed, numerous minor changes may well be made.

I claim:

1. A tire inflating device comprising a flat casing and means for clamping it to the outer side of a vehicle wheel, said casing having a central hollow hub to receive the wheel hub, a tire pump in said casing, and operating means for said pump positioned in said casing and including a central driving wheel mounted on said hub of the casing, and means for holding said driving wheel against rotation with the casing.

2. A tire inflating device comprising a flat casing and means for clamping it to the outer side of a vehicle wheel, said casing having a central tubular hub to receive the hub of the wheel, and having a removable outer side plate formed with a central opening, a ring fitting rotatably within said opening, a driving gear rotatably mounted on said tubular hub and secured to said ring, a second gear meshing with said driving gear, both gears being positioned in the casing, a walking beam in the casing connected operatively to said second gear, a reciprocating pump in the casing operatively connected to said beam to be operated therefrom, the outlet of said pump having means for attaching it to the tire valve, an arm connected to the aforesaid ring and positioned parallel with the outer side of the casing, and means for holding said arm against rotation with said casing.

3. The combination of a tire pump for application to a vehicle wheel, said pump having a driving wheel positioned adjacent the wheel hub, a crank arm connected to said driving wheel and having a pivoted hand hold formed with a longitudinal bore, a rod for reception in said bore when said hand hold is disposed longitudinally of said crank arm, whereby to prevent turning of the driving wheel with the vehicle wheel, and means for holding said hand hold at right angles to the crank arm when the pump is to be operated by hand.

4. The combination of a tire pump for application to a vehicle wheel, said pump having a driving wheel positioned adjacent the wheel hub, a crank arm connected to said driving wheel and having a longitudinal slot, a hand hold pivoted in said slot for swinging into the same, said hand hold having a longitudinal bore, a rod for reception in said bore when said hand hold is disposed within the slot, whereby to prevent turning of the driving wheel with the vehicle wheel, and a slide in said slot adapted to be moved into contact with said hand hold when the latter is swung outwardly into right angular relation with said crank arm, whereby the pump may be operated by hand.

In testimony whereof I have hereunto set my hand in the presence of two subscribing witnesses.

GEORGE KEITH.

Witnesses:
MORRIS P. HATHON,
OWEN ANDERSON.